(12) United States Patent
Venkatesh et al.

(10) Patent No.: US 11,880,259 B2
(45) Date of Patent: Jan. 23, 2024

(54) SMART ASSERTION MANAGEMENT

(71) Applicant: Apple Inc., Cupertino, CA (US)

(72) Inventors: Archana Venkatesh, Santa Clara, CA (US); Vaibhav Gautam, San Jose, CA (US); Ning Ding, San Jose, CA (US); Roberto Alvarez, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 72 days.

(21) Appl. No.: 17/522,451

(22) Filed: Nov. 9, 2021

(65) Prior Publication Data

US 2023/0092784 A1    Mar. 23, 2023

Related U.S. Application Data

(60) Provisional application No. 63/246,503, filed on Sep. 21, 2021.

(51) Int. Cl.
*G06F 1/32* (2019.01)
*G06F 1/3228* (2019.01)
*G06F 1/3296* (2019.01)

(52) U.S. Cl.
CPC .......... *G06F 1/3228* (2013.01); *G06F 1/3296* (2013.01)

(58) Field of Classification Search
CPC .............................. G06F 1/3228; G06F 1/3296
See application file for complete search history.

(56) References Cited

U.S. PATENT DOCUMENTS

| 11,442,527 B2* | 9/2022 | Files | G06F 1/3231 |
| 2003/0051181 A1* | 3/2003 | Magee | G06F 1/3231 |
| | | | 713/320 |
| 2016/0361662 A1* | 12/2016 | Karunaratne | G06F 3/038 |

* cited by examiner

*Primary Examiner* — Nitin C Patel
(74) *Attorney, Agent, or Firm* — FLETCHER YODER PC

(57) ABSTRACT

The present disclosure relates to techniques for managing power assertions associated with applications that may run on an electronic device. For example, to reduce power consumption of power available on a power source of the electronic device, the electronic device may start a timer after receiving a request for a power assertion. When the timer expires, the electronic device may enter a low power state.

20 Claims, 5 Drawing Sheets

SMART ASSERTION MANAGEMENT

CROSS-REFERENCE TO RELATED APPLICATIONS

This application claims priority to U.S. Provisional Patent Application No. 63/246,503, entitled "SMART ASSERTION MANAGEMENT," filed on Sep. 21, 2021, which is incorporated herein by reference in its entirety for all purposes.

BACKGROUND

The present disclosure relates generally to electronic devices, and more specifically to power allocation for processes to be performed by the electronic devices.

In an electronic device, power (e.g., electrical power provided by a power source such as a battery) may be allocated to programs or applications that execute processes on the electronic device. For example, when a program calls for a task to be performed (e.g., by a processor of the electronic device), power for the task may be allocated, and the task may be performed. A program or application that has been allocated power may be referred to as having a "power assertion." The task (or a process for performing the task) may continue to execute until the power assertion ends. In some cases, when a power assertion is present, the electronic device may be unable to enter a low power state. That is, when the power assertion is present, the electronic device may utilize a higher amount of power than would be used if the device were in the low power state. Thus, in cases in which a power assertion remains active for an excessive period of time, power may continue to be consumed, which may lead to a shortened amount of time the electronic device may be powered. For instance, for a battery-powered electronic device, such cases may reduce a battery life or state-of-charge of the battery of the electronic device.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an electronic device includes a display and processing circuitry communicatively coupled to the display. The processing circuitry is configured to implement a system power manager. The system power manager is configured to receive a power assertion request from a client running on the electronic device, cause a timer to be started after receiving the power assertion request, determine whether the timer has expired, and cause the electronic device to enter a sleep mode after determining the timer has expired.

In another embodiment, a tangible, non-transitory, computer-readable medium includes instructions that, when executed by processing circuitry of an electronic device, cause the processing circuitry to receive first contextual data indicative of a status of a display of the electronic device, a location of the electronic device, an audio status of the electronic device, an amount of electric power available to the electronic device, a charging status of a power source of the electronic device, or any combination thereof. The instructions, when executed, also cause the processing circuitry to cause a timer to be started based on the first contextual data being indicative of the electronic device being in an inactive state. Moreover, the instructions, when executed, cause the processing circuitry to determine whether the timer has expired after causing the timer to be started. Furthermore, the instructions, when executed, cause the processing circuitry to cause the electronic device to enter a sleep mode after determining the timer has expired.

In yet another embodiment, a computer-implemented method includes determining, by a system power manager of an electronic device, that first contextual data is indicative of inactive use of the electronic device. The first contextual data includes a status of a display of the electronic device, a location of the electronic device, an audio status of the electronic device, an amount of electric power available to the electronic device, a charging status of a power source of the electronic device, or any combination thereof. The computer-implemented method also includes causing, by the system power manager, a timer to be started in response to determining that the first contextual data is indicative of the inactive use of the electronic device. Additionally, the computer-implemented method includes determining, by the system power manager, that the timer has expired and causing, by the system power manager, the electronic device to enter a sleep mode in response to determining that the timer has expired.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
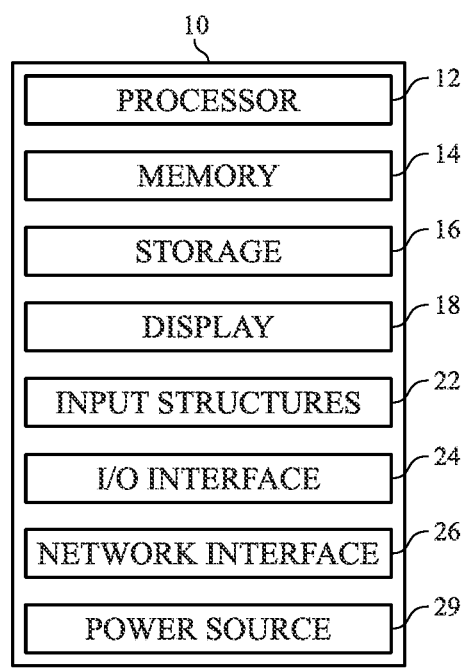
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

This disclosure is directed to managing power assertions of an electronic device. In an electronic device, power (e.g., electrical power provided by a power source such as a battery) may be allocated to programs or applications that execute processes on the electronic device. For example, when a program calls for a task to be performed (e.g., by a processor of the electronic device), power for the task may be allocated, and the task may be performed. A program or application that has been allocated power may be referred to as having a "power assertion." The task (or a process for performing the task) may continue to execute until the power assertion ends. In some cases, when a power assertion is present, the electronic device may be unable to enter a low power state. That is, when the power assertion is present, the electronic device may utilize a higher amount of power than would be used if the device were in the low power state. Thus, in cases in which a power assertion remains active for an excessive period of time, power may continue to be consumed, which may lead to a shortened amount of time the electronic device may be powered. For instance, for a battery-powered electronic device, such cases may reduce a battery life or state-of-charge of the battery of the electronic device.

Embodiments herein provide various techniques to manage power assertions to aid the electronic device to conserve power or state-of-charge of its power source. For example, as described below, a system power manager may unilaterally terminate power assertions utilizing a timer and contextual data. More specifically, the system power manager may utilize the timer so that power assertions may only remain active for a particular amount of time (e.g., the amount of time to which the timer is set), and the system power manager may utilize the contextual data to determine whether certain features or components of the electronic device are being used or if the electronic device itself is in an active state. The system power manager may cause the timer to be started when the device is not in an active state. For example, the timer may be started when only background processors or programs (e.g., daemons) are running on the electronic device. The system power manager may monitor the contextual data to determine whether to stop the timer. Upon expiration of the timer, the system power manager may terminate the power assertions and cause the electronic device to be placed into a low power mode, such as a sleep mode. Accordingly, the system power manager may terminate power assertions that may otherwise continue to drain power from the power source of the electronic device when the electronic device is not being actively used, thereby enabling the electronic device to conserve power.

Keeping the foregoing in mind, FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth. The power source 29 of the electronic device 10 may include any suitable source of power, such as a rechargeable lithium polymer (Li-poly) battery and/or an alternating current (AC) power converter.

Figure 2:
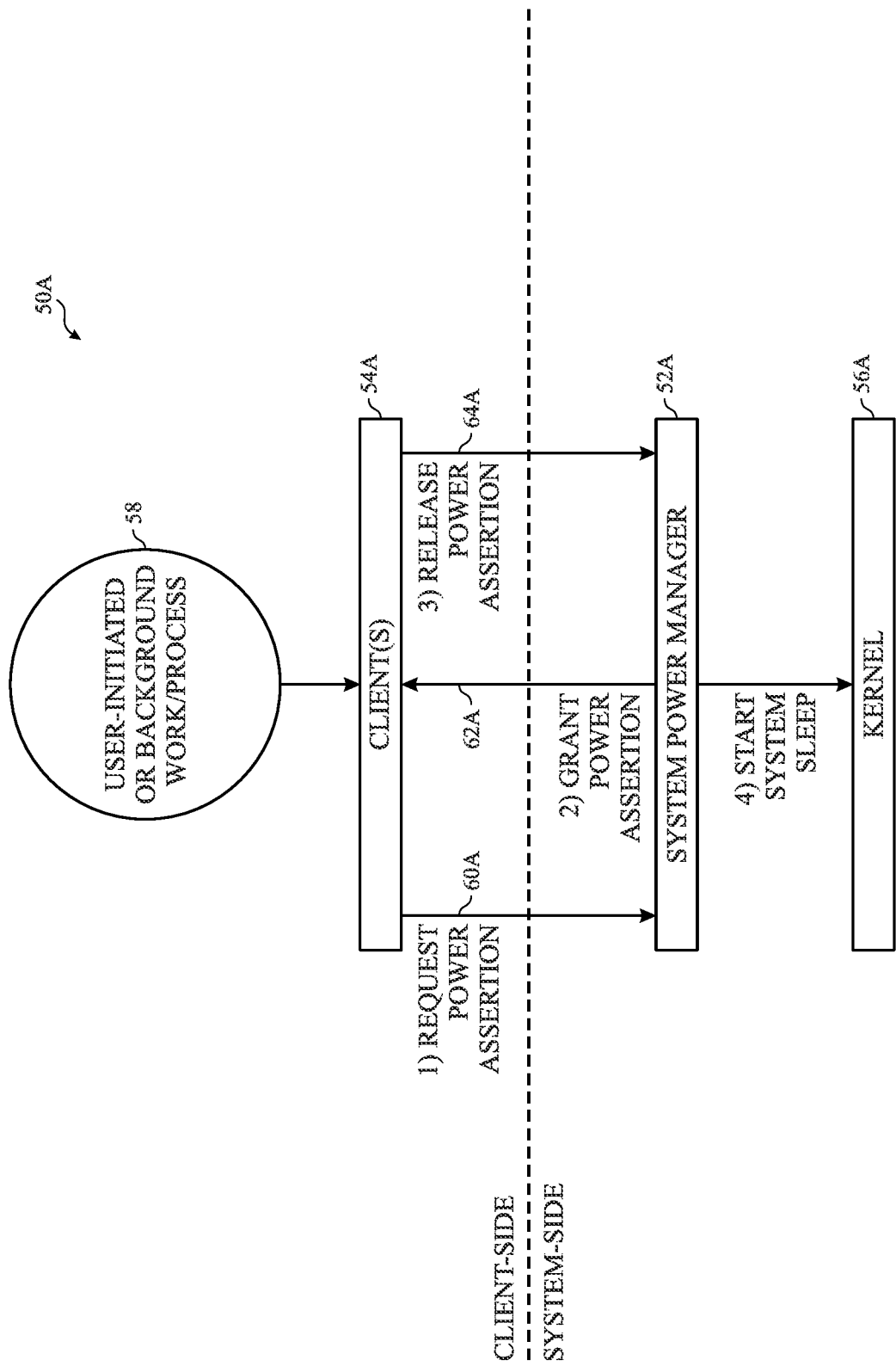
FIG. 2 is a block diagram of a power assertion management system that may be implemented on the electronic device of FIG. 1, according to embodiments of the present disclosure.

Continuing with the drawings, FIG. 2 is a block diagram of a power assertion management system 50A. As illustrated, the power assertion system includes a system power manager 52A, one or more clients 54A, and a kernel 56A. The power assertion management system 50A and its components (e.g., the system power manager 52A, the clients 54A, and the kernel 56A) may be implemented in software, hardware, or a combination thereof. For example, the power assertion management system 50A may be implemented by the processor 12 by executing computer-readable instructions. More specifically, "system-side" components of the power assertion management system 50A may be implemented by an operating system, which in turn may be implemented by the processor 12 executing computer-readable instructions stored in the memory 14 and/or the storage 16. "Client-side" components, such as the clients 54A, may be programs or applications (e.g., first-party or third-party client programs or applications) that communicate with the operating system, for example, to execute or run on the electronic device 10. For example, the processor 12 may execute computer-readable instructions for the clients 54A to cause the clients 54A to run on the electronic device 10, during which time the clients 54A may interact with (e.g., send or receive signals to or from) the operating system of the electronic device 10. The clients 54A may interact with the operating system or other clients 54A using one or more application programming interfaces (APIs), service provider interfaces (SPIs), or a combination thereof. The clients 54A may include any software that may be executed by the processor 12. For example, the clients 54A may include, but are not limited to, image viewing or recording software (e.g., a camera program used to capture photographs or video, a photograph or video viewing application), internet browsers, navigation software, games, email applications, navigation software, audio software (e.g., an application utilized to play or record audio content such as music), productivity software (e.g., spreadsheet software, slide presentation software, or word processing software), and so on. While these examples are of applications that may run in the foreground (e.g., such that the applications have visual representations that are displayed on the display 18, such that the applications may enable user interaction, and so on), the clients 54A may also include software that operates in the background (e.g., such that the applications do not have visual representations that are displayed on the display 18, such that the applications do not provide any user interaction, and so on), such as daemons. In other words, the clients 54A may include a program or extension thereof that interacts with the operating system but does not have a user interface with which the user can interact.

While the electronic device 10 is operating, user-initiated or background work/processes 58 associated with the clients 54A may run. The user-initiated or background work/processes 58, which may be referred to as "process 58" or "processes 58," for example, may be initiated based on the user's interaction with the electronic device 10 (e.g., a user input to use or interact with an application) or due to the client 54A utilizing or performing a background process.

The system power manager 52 may manage power assertions for the electronic device. A power assertion may be a feature that enables the clients 54A (e.g., applications or daemons) to keep the system (e.g., the operating system) running or operational. As represented by line 60A, to perform the process 58, the client 54A may request a power assertion from the system power manager 52. As illustrated by line 62A, the system power manager 52A may provide the power assertion to the client 54A (e.g., grant the request for the power assertion received from the client 54A). While the power assertion is maintained, the electronic device 10 may remain in an active state (as opposed to a low-power state such as a sleep mode). As depicted by line 64A, the client 54A may release the power assertion upon completion of the process 58 (e.g., by requesting release of the power assertion from the system power manager 52A). For instance, in the case of a user listening to music on the electronic device 10 using a music playing application, a power assertion may be acquired or held throughout the duration of the playback of music, and the client 54A may request that the system power manager 52A release (e.g., end or terminate) the power assertion when the user stops listening to music (e.g., in response to a user selecting a "stop" interface element in the music playing application or by closing the music playing application). As another example, in the case of content being uploaded to a cloud server, a power assertion may be acquired by a networking program, maintained while uploading is occurring, and released upon completion of the uploading of the content. The system power manager 52 may also keep track of all active power assertions (e.g., power assertions that have been granted but not yet released) and manage the active power assertions (e.g., track which power assertions are active and terminate the power assertions at an appropriate time). Thus, the system power manager 52A may manage power assertions for an operating system (and the electronic device 10) by receiving power assertion requests from the clients 54, granting the power assertion requests, and releasing or ending the power assertions.

To help conserve power of the power source 29, the system power manager 52A may cause the electronic device 10 to enter a low power state, which may be referred to as "sleep mode." The sleep mode generally refers to a low power state in which the electronic device 10 uses less power to operate relative to when the electronic device 10 is in an active, user interaction mode. The sleep mode may include any low power state including, but not limited to, an idle state, a hibernation mode, a suspend state. While in sleep mode, electronic components of the electronic device 10, including the processor 12, may be placed into a low power state. For example, in the sleep mode, the display 18 of the electronic device 10 may be in an "off" state in which the display 18 does not display content. In some cases, the system power manager 52A may initiate the sleep mode when no power assertions are present. To initiate the sleep mode, the system power manager 52A may send a request to the kernel 56A to enter the sleep mode. In response to receiving such a request, the kernel 56A, which may be responsible for placing hardware into a low power state or off state, may cause the hardware to be placed in the low power state or off state. In this manner, the system power manager 52A may help extend the life (e.g., battery life) of the power source 29 of the electronic device 10.

In some cases, power assertions may be maintained for extended periods of time, which may lead to energy of the power source 29 being drained. For instance, in some instances, clients 54A may not request release of a power assertion in a timely manner. As another example, certain clients 54A, such as daemons, may be associated with non-user initiated workflows (e.g., processes 58) that keep the electronic device in an active state for extended periods of time (e.g., minutes or hours). In the active state, it is possible that the display 18 of the electronic device 10 may appear to be off (e.g., not showing content), but the display 18 and the components thereof may not be in a reduced or lower power state. Similarly, other components of the electronic device 10, such as the processor 12, may also not be in a lower power state. Accordingly, even though the electronic device 10 may appear to a user to not be consuming undesirable amounts of energy, the power source 29 may nevertheless be drained of energy in quantities that the user may not be expecting. If left in this state for a long enough time, the power source 29 may be drained of energy altogether, and then the user may not be able to use the electronic device 10 until the power source 29 is recharged.

Figure 3:
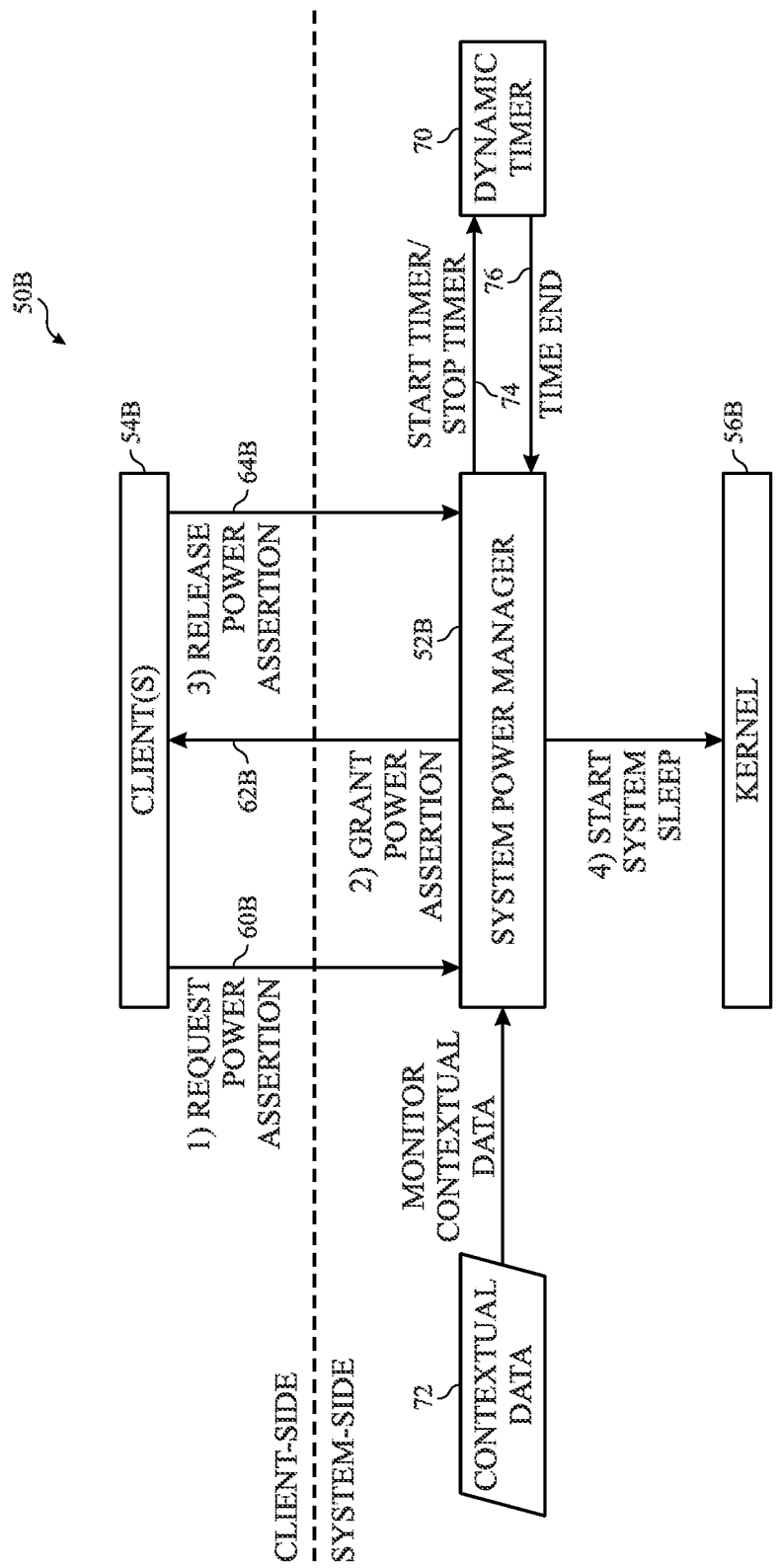
FIG. 3 is a block diagram of another power assertion management system that may be implemented on the electronic device of FIG. 1 that illustrates managing power assertions using contextual data, according to embodiments of the present disclosure.

To reduce or eliminate the occurrence of unwanted or unexpected power drainage, contextual information may be utilized to enable power assertions to be terminated. For example, FIG. 3 is a block diagram of a power assertion management system 50B that includes a system power manager 52B that may cause a dynamic timer 70 (which may also be referred to as "timer 70") to be started (and stopped) based on contextual data 72 that the system power manager 52B receives. The components of the power assertion management system 50B may otherwise be generally similar to those of the power assertion management system 50A. That is, the system power manager 52B, clients 54B, and kernel 56B may respectively function and be implemented in the manner described above with respect to the system power manager 52A, clients 54A, and kernel 56A. For instance, in response to receiving a power assertion request (as indicated by line 60B) from a client 54B, the system power manager 52B may grant a power assertion (as indicated by line 62B). When a process or task associated with the power assertion is completed, the client 54B may request the power assertion be released, and the system power manager 52B may terminate the power assertion (as indicated by line 64B).

With that said, the system power manager 52B may also activate the timer 70 as indicated by line 74, receive an indication that the timer 70 has ended (e.g., when an amount of time that the timer 70 was set to has expired) as indicated by line 76, and unilaterally end a power assertion (or several power assertions) in response to receiving an indication that the timer 70 has expired. More specifically, as discussed in detail below, the system power manager 52B may limit the duration of power assertions for background processes (e.g., non-user initiated background processes) to a desired amount of time (e.g., the amount of time to which the timer 70 is set). If the timer 70 expires prior to a user-initiated activity occurring, the system power manager 52B may cause the power assertion(s) to be released, thereby enabling the electronic device 10 to be placed into a low power mode (e.g., sleep mode) to help conserve power. In this manner, the system power manager 52B may prevent clients 54B from causing power assertions to be maintained for a longer than desirable amount of time, thereby reducing the occurrence of unwanted or unexpected energy drainage of the power source 29 of the electronic device 10.

The contextual data 72 (which may also be referred to as "contextual information 72"), may be provided by components of the electronic device 10 as well as applications or programs being executed by the processor 12. For example, the contextual data associated with the display 18 may be indicative of a display state such as whether the display is on (e.g., displaying content) or off (e.g., not displaying content). The contextual data 72 may also be indicative of an audio playback state (e.g., an audio status) of the electronic device 10 such as whether an application of the electronic device 10 is playing audio content or not playing audio content. The contextual data 72 may additionally or alternatively be associated with location information or use of a navigation application of the electronic device 10. For instance, the contextual data 72 may be indicative of the electronic device 10 being located at a user's place of residence or workplace. The contextual data 72 may also be indicative of location tracking or radionavigation capabilities (e.g., Global Positioning System (GPS), Galileo, Global Navigation Satellite System (GLONASS), BeiDou Navigation Satellite System (BDS)) of the electronic device 10 being active or used by one or more applications or programs of the electronic device 10. The contextual data 72 may relate to energy or power usage. For example, the contextual data 72 may be indicative of an amount of energy available on the power source 29 (e.g., a percentage or amount of battery life remaining). In the case of the power source 29 being a battery or other, the contextual data 72 may also be indicative of whether the power source 29 is in a charging state or drain state (e.g., using energy from the power source 29 when the power source 29 is not being charged). The contextual data 72 may also be indicative of a type of network connection the electronic device 10 has (e.g., using the network interface 26). As discussed in more detail below with respect to FIG. 4B, the system power manager 52B may utilize the contextual data 72 to control the timer 70.

Figure 4A:
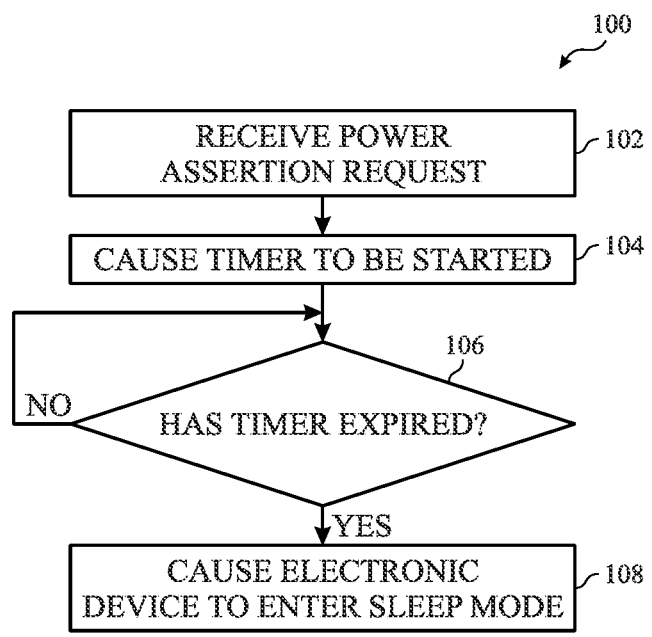
FIG. 4A is a flow diagram of a process for managing power assertions, according to embodiments of the present disclosure.

Keeping the foregoing in mind, FIG. 4A is a flowchart of a process 100 for managing power assertions, according to embodiments of the present disclosure. Any suitable device (e.g., a controller) that may control components of the electronic device 10, such as the processor 12, may perform the process 100. In some embodiments, the process 100 may be implemented by executing instructions stored in a tangible, non-transitory, computer-readable medium, such as the memory 14 or storage 16, using the processor 12. For example, the process 100 may be performed at least in part by one or more software components, such as an operating system of the electronic device 10, one or more software applications of the electronic device 10, the system power managers 52A, 52B, and the like. While the process 100 is described using steps in a specific sequence, it should be understood that the present disclosure contemplates that the described steps may be performed in different sequences than the sequence illustrated, and certain described steps may be skipped or not performed altogether.

At process block 102, the system power manager 52B receives a power assertion request from a client (e.g., client 54B) that is running on the electronic device 10. For example, as discussed above, the client 54B may send the power assertion request so that a process (e.g., a foreground or background process) may be performed.

At process block 104, the system power manager 52B may cause a timer (e.g., timer 70) to be started upon, after, or in response to, receiving the power assertion request. The timer 70 may have a default time that the timer 70 is set to run for, such as a value that may be stored in the memory 14, storage 16, or the processor 12 (e.g., in cache memory). In other embodiments, such as described below with respect to FIG. 4B, the system power manager 52B may determine the amount of time that the timer 70 may be set to based on the contextual data 72. In yet another embodiment, a user may set the amount of time that the timer 70 may be set to. In any case, at process block 104, the system power manager 52B may set the timer 70 for an amount of time and cause the timer 70 to being running.

At decision block 106, the system power manager 52B may determine whether the timer 70 has expired. In other words, the system power manager 52B may determine whether the amount of time that the timer 70 was set to has elapsed. The system power manager 52B may make such a determination based on receiving an indication that the timer 70 has expired (e.g., as indicated by line 76 in FIG. 3). In response to determining that the timer 70 has not expired, the system power manager 52B may continue to determine whether the timer 70 has expired until determining that the timer 70 has expired.

Upon determining at decision block 106 that the timer 70 has expired, at process block 108, the system power manager 52B may cause the electronic device 10 to enter a sleep mode. For example, as described above, the system power manager 52B may send a request to the kernel 56B to cause components of the electronic device 10 to be placed in an off state or lower power state. In this manner, the system power manager 52B may terminate power assertions that may otherwise be maintained for undesirable amounts of time that could lead to unexpected draining of the power source 29. As such, performance of the process 100 may enable the power source 29 of the electronic device 10 to better conserve power.

Figure 4B:
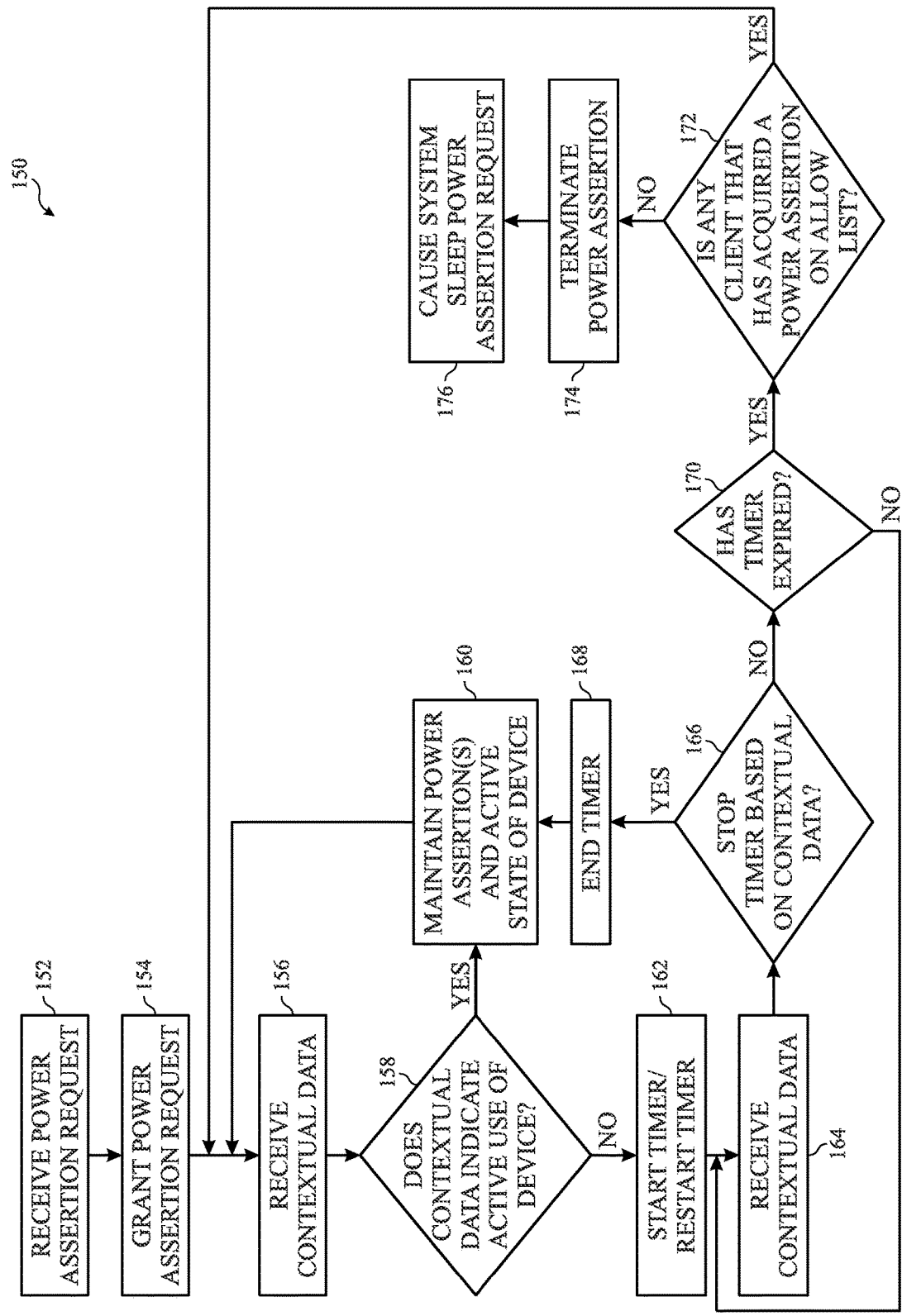
FIG. 4B is a flow diagram of a process for managing power assertions utilizing contextual data, according to embodiments of the present disclosure.

As noted above, the system power manager 52B may utilize the contextual data 72 to manage power assertions. With this in mind, FIG. 4B is a flowchart of a process 150 for managing power assertions utilizing contextual data, according to embodiments of the present disclosure. Any suitable device (e.g., a controller) that may control components of the electronic device 10, such as the processor 12, may perform the process 150. In some embodiments, the process 150 may be implemented by executing instructions stored in a tangible, non-transitory, computer-readable medium, such as the memory 14 or storage 16, using the processor 12. For example, the process 150 may be performed at least in part by one or more software components, such as an operating system of the electronic device 10, one or more software applications of the electronic device 10, the system power manager 52B, and the like. While the process 150 is described using steps in a specific sequence, it should be understood that the present disclosure contemplates that the described steps may be performed in different sequences than the sequence illustrated, and certain described steps may be skipped or not performed altogether.

At process block 152, the system power manager 52B receives a power assertion request from a client 54B on the electronic device 10. For example, as discussed above, the client 54B may send the power assertion request to perform a process (e.g., a foreground or background process). In response to receiving the power assertion request, at process block 154, the system power manager 52B may grant the power assertion request. In some cases, it should be understood that the system power manager 52B may determine not to grant the power assertion request (e.g., if there is insufficient energy or state of charge stored in the power source 29, if there is at least a threshold number of power assertions active, or the like).

At process block 156, the system power manager 52B receives contextual data (e.g., a first set of contextual data 72). As described above, the contextual data 72 may be generated by physical components of the electronic device 10 or by software (e.g., programs or applications) that may execute on the electronic device 10.

At decision block 158, the system power manager 52B determines whether the contextual data 72 is indicative of active use of the electronic device 10. As used herein, "active use" of the electronic device 10 may refer to a user interacting with or otherwise using the electronic device 10. As non-limiting examples, when the contextual data 72 is indicative of a user utilizing or having recently utilized (e.g., within a set period of time such as ten or fifteen or sixty seconds) the input structures 22, the display being in an on state (e.g., actively displaying content), or an application or process (e.g., process 58) running in the foreground, the system power manager 52B may determine that the contextual data 72 is indicative of active use of the electronic device 10. As further examples, in instances in which the electronic device 10 is communicating with another device (e.g., via a phone call, video call, or the Internet), the contextual data 72 may indicate that the network interface 26 is being used for such a purpose, and the system power manager 52B may determine that there is active use of the electronic device 10. It should also be noted that, in some embodiments, when the contextual data 72 is indicative of the power source 29 having a charging state, the system power manager 52B may determine that the contextual data 72 is indicative of active use of the electronic device regardless of what other portions of the contextual data 72 may indicate. In other words, when the power source 29 is receiving power, the system power manager 52B may determine that the electronic device 10 is actively being used even if the electronic device 10 is not being used by a user, since it may be unnecessary to conserve energy of the electronic device 10 since it is charging (e.g., plugged into an electrical outlet). Conversely, "inactive use" of the electronic device 10 may refer to when the user is not actively using the electronic device 10. For example, when only background processes or clients 54B are running on the electronic device 10, the electronic device 10 may be said to have a state of inactive use. In some embodiments, inactive use of the electronic device 10 may only occur when the power source 29 is in a discharging state, such that it is not in a charging state (e.g., indicative of being plugged into an electrical outlet).

Upon determining that the contextual data 72 is indicative of active use of the electronic device 10, at process block 160, system power manager 52B may maintain the power assertion (and any other active power assertion) and an active state of the electronic device 10. The "active state" may refer be a regular mode, a normal power mode, a high power mode, and/or a performance state of operation of the electronic device 10, as opposed to a reduced power mode of operation, such as the sleep mode. Additionally, the electronic device 10 may receive additional contextual data 72 (as indicated by process block 156). As such, while there is contextual data 72 indicative of the electronic device 10 being actively used, the system power manager 52B keep the active state of the electronic device 10 (e.g., as opposed to causing the electronic device 10 to be placed in the sleep mode).

However, upon determining that the contextual data is not indicative of active use of the electronic device 10, at process block 162, the system power manager 52B may start the timer 70. For example, the system power manager 52B may send a request to the timer 70 to start counting down an amount of time, which may be determined by the system power manager 52. For instance, in one embodiment, the timer 70 may have a default (e.g., predetermined) amount of time that is stored in the memory 14 or the storage 16. As an example, the predetermined amount of time may be five minutes, ten minutes, fifteen minutes, or any other suitable amount of time. The system power manager 52 may determine the amount of time for the timer 70 by reading the predetermined value from the memory 14 or storage 16 and including the predetermined value to the timer 70 in the request to start the timer 70. In other embodiments, the system power manager 52B may determine the amount of time to which the timer 70 will be set based on the contextual data 72. For example, the system power manager 52B may utilize a first amount of time (e.g., the predetermined value discussed above) when the contextual data 72 is indicative of the power source 29 being in a charging state (e.g., a state in which power is being supplied to the power source 29), an amount of energy in the power source 29 being above a threshold value (e.g., having an amount of remaining battery life above a threshold value), the electronic device 10 utilizing a LAN or WLAN (e.g., Wi-Fi network), or a combination thereof. When the power source 29 is in a drain state (e.g., not charging), the system power manager 52B may utilize a second amount of time that is less than the first amount of time when the amount of remaining power of the power source 29 is at or below the threshold value or when the electronic device 10 is utilizing other types of communication networks such as cellular networks or WANs (e.g., 3G, 4G, or 5G networks). Furthermore, the power source 29 is in a drain state (e.g., not charging), the system power manager 52B may utilize a third amount of time that is less than the second amount of time when the amount of remaining power of the power source 29 is at or below the threshold value and when the electronic device 10 is utilizing a cellular networks or WAN (e.g., a 3G, 4G, or 5G network).

Before continuing to discuss the process 150, it should be noted that the discussion provided above is merely one example of how the system power manager 52B may determine the amount of time for the timer 70 (e.g., based on a status of the power source 29, amount of power remaining in the power source, type of network connection, or a combination thereof). In other embodiments, the system power manager 52B may utilize other techniques for determining the amount of timer for the timer 70. For instance, in another embodiment, the system power manager 52B may determine the amount of time for the timer 70 based on an amount of power remaining on the power source 29. For example, there may be a lookup table stored in the memory 14 or storage 16 that indicates an amount of the timer 70 for increments of amounts of power available on the power source 29 (e.g., every five percent or 10 percent or twenty-five percent of a maximum amount of power of the power source 29). The system power manager 52B may utilize the values in such a lookup table to determine the amount of time to which the timer 70 should be set. As yet another example, the system power manager 52B may utilize a different lookup table to determine the amount of time to which the timer 70 should be set may use the increments stated above when the electronic device is connected to a LAN or WLAN network and use values that are a fractions (e.g., one-half, one-third, one-quarter) of the increments when connected to a mobile network or WAN (e.g., a 3G, 4G, or 5G network). For example, when the power source 29 has fifty percent of an energy capacity remaining and the electronic device is connected to a WLAN network, the amount of time the timer 70 should be set to be a first value. When the power source 29 has the same amount of power but the electronic device 10 is coupled to a cellular network, the system power manager 52B may determine (using the lookup table) that the timer 70 should be set for an amount of time that is one-half of the first value.

Furthermore, it should be noted that the electronic device 10 (or any computing device capable of generating the lookup tables discussed above) may utilize machine-learning to determine the amount of time for the timer 70 based on the contextual data 72. As used herein, machine-learning may refer to algorithms and statistical models that computer systems (e.g., including the electronic device 10) use to perform a specific task with or without using explicit instructions. For example, a machine-learning process may generate a mathematical model based on a sample of data, known as "training data," in order to make predictions or decisions without being explicitly programmed to perform the task. Different types of machine-learning may be utilized to determine the amount of time for the timer 70. For example, in some embodiments (e.g., when particular known examples exist that correlate to future predictions or estimates that the machine-learning engine may be tasked with generating), a machine-learning engine (which may be implemented wholly or partially using the electronic device 10) may implement supervised machine-learning. In supervised machine-learning, a mathematical model of a set of data contains both inputs and desired outputs. This data is referred to as "training data" and may include a set of training examples. Each training example may have one or more inputs and a desired output, also known as a supervisory signal. In a mathematical model, each training example is represented by an array or vector, sometimes called a feature vector, and the training data is represented by a matrix. Through iterative optimization of an objective function, supervised learning algorithms may learn a function that may be used to predict an output associated with new inputs. An optimal function may allow the algorithm to correctly determine the output for inputs that were not a part of the training data. An algorithm that improves the accuracy of its outputs or predictions over time is said to have learned to perform that task.

Supervised learning algorithms may include classification and regression techniques. Classification algorithms may be used when the outputs are restricted to a limited set of values, and regression algorithms may be used when the outputs have a numerical value within a range. Similarity learning is an area of supervised machine-learning closely related to regression and classification, but the goal is to learn from examples using a similarity function that measures how similar or related two objects are. Similarity learning has applications in ranking, recommendation systems, visual identity tracking, face verification, and speaker verification.

Additionally and/or alternatively, in some situations, it may be beneficial for the machine-learning engine to utilize unsupervised learning (e.g., when particular output types are unknown). Unsupervised learning algorithms take a set of data that contains only inputs, and find structure in the data, like grouping or clustering of data points. The algorithms, therefore, learn from test data that has not been labeled, classified, or categorized. Instead of responding to feedback, unsupervised learning algorithms identify commonalities in the data and react based on the presence or absence of such commonalities in each new piece of data.

That is, the machine-learning engine may implement cluster analysis, which is the assignment of a set of observations into subsets (called clusters) so that observations within the same cluster are similar according to one or more predesignated criteria, while observations drawn from different clusters are dissimilar. Different clustering techniques make different assumptions on the structure of the data, often defined by some similarity metric and evaluated, for example, by internal compactness, or the similarity between members of the same cluster, and separation, the difference between clusters. In additional or alternative embodiments, the machine-learning engine may implement other machine-learning techniques, such as those based on estimated density and graph connectivity.

Continuing with the discussion of the process 150, at process block 164, the system power manager 52B may receive contextual data 72 (e.g., a second set of contextual data 72 or additional contextual data 72). In particular, the contextual data 72 may be received at a second or subsequent time compared to the contextual data received in process block 156. At decision block 166, the system power manager 52B determines, based on the subsequent contextual data 72, whether to stop the timer 70. More specifically, the system power manager 52B may determine to stop the timer 70 by determining that the contextual data 72 is indicative of active use of the electronic device 10. In another embodiment, the system power manager 52B may determine to stop the timer 70 by determining that the contextual data 72 is indicative of active use of the electronic device 10 or by determining that the power source 29 is in a charging state. Upon determining to stop the timer 70, at process block 168, the system power manager 52B ends the timer 70. More specifically, the system power manager 52B may request the timer 70 stop the timer 70, and the timer 70 may stop in response to receiving the request. After the timer 70 is stopped, active power assertions are maintained, and if the electronic device 10 is in an active state, the active state is maintained (as indicated by process block 160). At a later time, the system power manager 52B may receive additional contextual data (as indicated by process block 156) and potentially restart the timer 70 based on the additional contextual data 72. When restarting the timer 70, the system power manager 52 may dynamically determine the amount of time to which the timer 70 should be set based on the additional contextual data 72, as described above.

However, upon determining not to stop the timer 70 based on the subsequent contextual data 72, at decision block 170, the system power manager 52B may determine whether the timer 70 has expired. For instance, the system power manager 52B may determine whether the timer 70 has provided an indication that the timer 70 has expired. In response to determining that the timer 70 has not expired, the system power manager 52B may receive subsequent contextual data 72 (as indicated by process block 164). As such, the system power manager 52B may continue to receive contextual data 72 to determine whether to stop the timer 70 and/or whether the timer 70 has expired (e.g., until determining to stop the timer 70 or that the timer 70 has expired).

In response to determining that the timer 70 has expired, at decision block 172, the system power manager 52B may determine whether there are any clients 54B that have acquired power assertions that are on an allow list. The allow list, which may be stored in the memory 14 or the storage 16, may be a list of clients 54B (e.g., programs, applications, daemons) for which the electronic device 10 will not be placed into the sleep mode when any of the clients 54B on the allow list has an active power assertion. In one embodiment, the allow list may include a navigation application, music playing application, video playing application, networking applications, or any combination thereof. In response to determining that there is a client 54B that has a power assertion (e.g., an active power assertion) that is on the allow list, the system power manager 52B may continue to receive contextual data (as indicated by process block 156). In this manner, the system power manager 52B may keep the electronic device 10 in an active state instead of causing the device to enter the sleep mode when one or more programs or applications of the electronic device 10 that are on the allow list have power assertions. Thus, when a program or application that is on the allow list has a power assertion, the system power manager 52B may not place electronic device 10 into the sleep mode, thereby enabling the application or program to continue running.

In response to determining that there are not any clients 54B with power assertions on the allow list, at process block 174, the system power manager 52B may terminate the power assertion(s). That is, the system power manager 52B may terminate any active power assertions. Furthermore, at process block 176, the system power manager 52B may send a request to the kernel 56B to cause the electronic device 10 to be put into the sleep mode. In this manner, the process 150 enables the power source 29 of the electronic device 10 to conserve power. For example, because the system power manager 52B may unilaterally terminate power assertions (e.g., using the timer 70), power assertions that may otherwise lead to unexpected or undesirable draining of the power source 29 may be reduced or eliminated.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electronic device comprising:
a display; and
processing circuitry communicatively coupled to the display, wherein the processing circuitry is configured to implement a system power manager configured to:
receive a power assertion request from a client running on the electronic device;
cause a timer to be started after receiving the power assertion request;
determine whether the timer has expired; and
cause the electronic device to enter a sleep mode after determining the timer has expired.

2. The electronic device of claim 1, wherein the system power manager is configured to:
receive first contextual data indicative of a status of the display, a first location of the electronic device, a first audio status of the electronic device, a first amount of power available to the electronic device, a first charging status of a power source of the electronic device, or any combination thereof; and
cause the timer to be started in response to the first contextual data being indicative of an inactive state of the electronic device.

3. The electronic device of claim 2, wherein the system power manager is configured to:
in response to determining that the timer has expired, determine whether the client is on an allow list; and
cause the electronic device to enter the sleep mode in response to determining that the client is not on the allow list.

4. The electronic device of claim 2, wherein the system power manager is configured to:
receive second contextual data indicative of a second status of the display, a second location of the electronic device, a second audio status of the electronic device, a second amount of electric power available to the electronic device, a second charging status of the power source of the electronic device, or any combination thereof;
determine whether to stop the timer based on the second contextual data;
cause the timer to be stopped in response to determining to stop the timer;
after causing the timer to be stopped, receive additional contextual data; and
determine whether to restart the timer based on the additional contextual data.

5. The electronic device of claim 4, wherein the system power manager is configured to determine allow the timer to continue to run in response to the second contextual data being indicative of:
the display being in an on state;
the electronic device playing audio content;
the second amount of electric power available to the electronic device being below a threshold amount of power;
the power source being in a drain state; or
any combination thereof.

6. The electronic device of claim 4, wherein the processing circuitry is configured to maintain a power assertion after stopping the timer and before receiving the additional contextual data.

7. The electronic device of claim 1, wherein the power assertion request is sent from a background process.

8. The electronic device of claim 1, wherein the power assertion request comprises a request for an allocation of power from a power source of the electronic device.

9. A tangible, non-transitory, computer-readable medium comprising instructions that, when executed by processing circuitry of an electronic device, cause the processing circuitry to:
receive first contextual data indicative of a status of a display of the electronic device, a location of the electronic device, an audio status of the electronic device, an amount of electric power available to the electronic device, a charging status of a power source of the electronic device, or any combination thereof;

cause a timer to be started based on the first contextual data being indicative of the electronic device being in an inactive state;

after causing the timer to be started, determine whether the timer has expired; and cause the electronic device to enter a sleep mode after determining the timer has expired.

10. The tangible, non-transitory, computer-readable medium of claim 9, wherein the instructions, when executed, cause the processing circuitry to determine, prior to causing the timer to start, an amount of time for the timer to count based on the first contextual data.

11. The tangible, non-transitory, computer-readable medium of claim 10, wherein the first contextual data comprises a network connectivity status of the electronic device.

12. The tangible, non-transitory, computer-readable medium of claim 11, wherein the instructions, when executed, cause the processing circuitry to:

determine the amount of time to be a first amount of time when the first contextual data is indicative of the power source being in a charging state, the electronic device being communicatively coupled to a first type of network, or both; and determine the amount of time to be a second amount of time that is less than the first amount of time when the first contextual data is indicative of the power source not being in the charging state, the electronic device being communicatively coupled to a second type of network that is different than the first type of network, or both.

13. The tangible, non-transitory, computer-readable medium of claim 9, wherein the first contextual data is indicative of the status of a display of the electronic device.

14. The tangible, non-transitory, computer-readable medium of claim 9, wherein the first contextual data is indicative of the location of the electronic device.

15. The tangible, non-transitory, computer-readable medium of claim 9, wherein:

the first contextual data is indicative of the audio status of the electronic device; and the audio status corresponds to whether an application of the electronic device is playing audio content.

16. The tangible, non-transitory, computer-readable medium of claim 9, wherein the first contextual data is indicative of the amount of electric power available to the electronic device.

17. The tangible, non-transitory, computer-readable medium of claim 16, wherein the first contextual data is indicative of the charging status of the power source of the electronic device.

18. A computer-implemented method comprising:

determining, by a system power manager of an electronic device, that first contextual data is indicative of inactive use of the electronic device, the first contextual data comprising a status of a display of the electronic device, a location of the electronic device, an audio status of the electronic device, an amount of electric power available to the electronic device, a charging status of a power source of the electronic device, or any combination thereof;

causing, by the system power manager, a timer to be started in response to determining that the first contextual data is indicative of the inactive use of the electronic device;

determining, by the system power manager, that the timer has expired; and causing, by the system power manager, the electronic device to enter a sleep mode in response to determining that the timer has expired.

19. The computer-implemented method of claim 18, comprising:

determining, by the system power manager, that second contextual data is indicative of active use of the electronic device, the second contextual data comprising a second status of the display, a second location of the electronic device, a second audio status of the electronic device, a second amount of electric power available to the electronic device, a second charging status of the power source of the electronic device, or a combination thereof; and causing, by the system power manager, the timer to stop in response to determining that the second contextual data is indicative of the active use of the electronic device.

20. The computer-implemented method of claim 18, comprising causing, by the system power manager, the timer to be set to a first amount of time that is less than a default amount of time based on the amount of electric power being below a threshold value, the first contextual data being indicative of a type of network connection, or both.

* * * * *